United States Patent
Vogt et al.

(10) Patent No.: US 9,504,129 B2
(45) Date of Patent: Nov. 22, 2016

(54) METHOD AND DEVICE FOR REGULATING AN ILLUMINANCE USING AN ADAPTIVE CONTROL LOOP FACTOR

(71) Applicant: TRIDONIC GMBH & CO KG, Dornbirn (AT)

(72) Inventors: Dominik Vogt, Dornbirn (AT); Gunther Sejkora, Schwarzenberg (AT)

(73) Assignee: TRIDONIC GMBH & CO KG, Dornbirn (AT)

( * ) Notice: Subject to any disclaimer, the term of this patent is extended or adjusted under 35 U.S.C. 154(b) by 0 days.

(21) Appl. No.: 14/389,520

(22) PCT Filed: Apr. 3, 2013

(86) PCT No.: PCT/AT2013/000056
§ 371 (c)(1),
(2) Date: Jan. 26, 2015

(87) PCT Pub. No.: WO2013/149275
PCT Pub. Date: Oct. 10, 2013

(65) Prior Publication Data
US 2015/0123548 A1    May 7, 2015

(30) Foreign Application Priority Data

Apr. 3, 2012   (DE) ............... 10 2012 006 860

(51) Int. Cl.
*H05B 37/02*    (2006.01)
*H05B 41/392*   (2006.01)
*H05B 33/08*    (2006.01)

(52) U.S. Cl.
CPC ...... *H05B 37/0227* (2013.01); *H05B 33/0851* (2013.01); *H05B 37/0218* (2013.01);
(Continued)

(58) Field of Classification Search
USPC ................. 315/247, 185 S, 209 R, 224, 291, 315/307–326
See application file for complete search history.

(56) References Cited

U.S. PATENT DOCUMENTS 6,060,843 A  *  5/2000  Primisser ............. H05B 41/282
                                              315/194
2005/0110416 A1   5/2005  Veskovic
(Continued)

FOREIGN PATENT DOCUMENTS

CN    201946280 U    8/2011
CN    102402220 A    4/2012
(Continued)

*Primary Examiner* — Tuyet Vo
(74) *Attorney, Agent, or Firm* — Volpe and Koenig, P.C.

(57) ABSTRACT

In order to regulate an illuminance, an actual value of a sensor (3) is queried, said value being dependent on the illuminance to be regulated and being regulated to a setpoint value. In a control step, an electronic computing device (11) determines an actuating step for an illuminant (2) on the basis of said actual value and a parameter value of a control parameter. The electronic computing device (11) determines a new parameter value of the control parameter for a subsequent control step on the basis of a first actual value which is received before the corresponding control step, and a second actual value which is determined after the corresponding control step.

16 Claims, 7 Drawing Sheets

(52) U.S. Cl.
CPC ....... *H05B 41/3922* (2013.01); *H05B 33/0815* (2013.01); *H05B 33/0869* (2013.01); *Y02B 20/46* (2013.01)

(56) References Cited

U.S. PATENT DOCUMENTS

| | | | |
|---|---|---|---|
| 2008/0074059 A1 | 3/2008 | Ahmed | |
| 2008/0103714 A1* | 5/2008 | Aldrich | G01J 3/46 702/81 |
| 2010/0289429 A1* | 11/2010 | Pollmann-Retsch | H05B 41/2928 315/307 |
| 2011/0089842 A1 | 4/2011 | Aldrich et al. | |
| 2011/0089855 A1 | 4/2011 | Roberts et al. | |
| 2012/0326632 A1* | 12/2012 | Kitagawa | H05B 33/0824 315/307 |
| 2015/0035447 A1* | 2/2015 | Kamoi | H05B 33/0818 315/224 |

FOREIGN PATENT DOCUMENTS

| | | |
|---|---|---|
| DE | 102008029816 A1 | 12/2009 |
| EP | 1323976 A2 | 7/2003 |
| WO | 2012045478 A1 | 4/2012 |

\* cited by examiner

METHOD AND DEVICE FOR REGULATING AN ILLUMINANCE USING AN ADAPTIVE CONTROL LOOP FACTOR

FIELD OF THE INVENTION

The invention relates to a method and an apparatus for regulating an illuminance. The invention relates particularly to such a method and such an apparatus as can be used to realize an approach to a setpoint illuminance.

BACKGROUND

Artificial light regulation is used in lighting systems. The aim of artificial light regulation is to achieve a setpoint illuminance consistently even under a changing extraneous light influence. By way of example, the illuminance on a reference surface, for example a work surface in an office, is meant to be kept as constant as possible even under variable and unknown extraneous light influence. To this end, a regulator that is provided with the present illuminance by at least one light sensor and artificial lighting that the regulator can use to compensate for a change in the illuminance within the limits of the artificial lighting are set. Such artificial light regulation can be used in light control systems that are used for interior lighting, for example.

Conventional artificial light regulating systems may be embodied such that they change their actuating element by the smallest possible unit in each control step in response to a discrepancy between an actual value and a setpoint value for an illuminance sensed by a sensor. Such an approach usually results in a slow approach to the setpoint value in multiple steps. If the difference between the actual value and the setpoint value is large in comparison with the increment of the actuating element that is used in each control step, the period of time before the setpoint value is reached again can likewise become large. If, by contrast, the increment is chosen to be large in order to achieve a faster approach to the setpoint value, there is the danger of "overshoot", in which a range of acceptable illuminances is missed and further actuation commands are required for compensation. Such overshoot can result in undesirable fluctuations in the illuminance. Both in the case of excessively small and in the case of excessively large actuation steps, the outlined scenarios can result in a large number of actuation commands needing to be produced. This can lead to an undesirable level of utilization of the available computation power and/or of transmission bandwidths for actuation commands. By way of example, the latter is a problem when the actuation commands are transmitted as digital commands via a bus, for example a DALI bus.

Furthermore, both excessively slow adjustment of the illuminance and an excessively fast change, particularly an "overshoot", are perceived as annoying.

Regulating systems in which the size of the control step is determined on the basis of the difference between the actual value and the setpoint value using one or more firm parameters, or parameters firmly set when the regulator is initialized, are also known. Such regulators also reach the setpoint value only after a series of control steps, which in turn can result in slow adjustment to suit the setpoint value or in "overshoot".

WO 02/45478 A1 describes information systems in which an illuminance is adjusted on the basis of the extraneous light. In this case, an increment or an actuation step is stipulated on the basis of the difference between the actual value and the setpoint value. The increment chosen for a subsequent control step is dependent only on the actual value of the illuminance that is determined following the preceding control step. The possible increments have fixed values. This can lead to difficulties if, by way of example, the behavior of a luminaire changes on account of aging. Adjustments to suit different luminaires can be involved in terms of work and cost, since appropriate maintenance may be required in situ.

It is an object of the invention to provide a method and an apparatus for regulating an artificial light control that reduce the risk of creep or overshoot behavior. It is an object of the invention to provide such methods and apparatuses as facilitate the adjustments to suit different luminaires or to suit different luminous fluxes, for example, with increasing aging of luminaires without this requiring separate maintenance to be performed on the regulator.

SUMMARY

The object is achieved by a method and an apparatus having the features specified in the independent patent claims. The dependent patent claims define developments of the invention.

In the case of methods and apparatuses according to exemplary embodiments, an influence of artificial lighting is determined during artificial light regulation. A control parameter is introduced, the parameter value of which can be adjusted in each case following control steps. The parameter value of the control parameter can estimate measured value differences that a sensor would sense between artificial lighting that is switched off and maximum luminous flux from the artificial lighting. The effect achieved by the automatic adjustment of the parameter value of the control parameter is adaptive regulation, which exhibits a self-learning behavior. For each control step, the control parameter can be used to estimate in advance how the measured illuminance should change. This estimation can be compared with the measured value that is determined in the next measurement step following the control step. In the event of a discrepancy between the estimation for the new illuminance that is expected following the control step and the illuminance that then actually occurs following the control step, the parameter value of the control parameter can be adjusted. This makes it possible to automatically take account of a changing behavior in a luminaire, for example on account of aging, and/or the method and the apparatus can be used for luminaires of different design on account of their self-learning behavior. The new parameter value determined for the control parameter following a control step can be used in the next control step in order to actuate the actuating element in the next control step.

In the case of a method for regulating an illuminance according to an exemplary embodiment, an actual value from a sensor, which is dependent on the illuminance to be regulated and which is intended to be regulated to a setpoint value, is determined and then a control step is executed. In the control step, a respective actuation step for a luminaire is determined on the basis of the determined actual value and a parameter value of a control parameter, and an actuation command that is produced on the basis of the actuation step is produced in order to actuate the luminaire. The method comprises the step of automatic adjustment of the parameter value of the control parameter following at least one control step. During the automatic adjustment, a new parameter value of the control parameter is determined on the basis of a first actual value from the sensor, which is determined before the corresponding control step, and a second actual value from the sensor, which is determined following the corresponding control step. The new parameter value of the control parameter is used for a subsequent control step.

The introduction of the control parameter and the automatic adjustment thereof allow the control method to be adapted automatically. This makes it possible to take account of different properties of the luminaire, but also of different reflection properties of the surface that is to be lit.

The step of automatic adjustment of the parameter value of the control parameter does not have to be performed following every control step. The step of automatic adjustment of the parameter value of the control parameter can be performed selectively on the basis of whether a particular adjustment criterion is satisfied.

The step of automatic adjustment of the parameter value of the control parameter realizes a self-learning correction procedure that can adjust the control parameter to suit the control results obtained. Thus, following a relatively short learning phase, regulation with little shoot or creep behavior can take place even in the case of large actuation value jumps. A further effect of self-learning adjustment is that lamp aging and even lamp failure can be compensated for and the installation continues to be regulated reliably.

The method can be used in order to regulate the illuminance on a reference surface, for example a work surface in an office. The sensor senses the illuminance on the reference surface. To this end, the sensor may be arranged such that it receives light reflected from the reference surface, for example.

In the control step, the actuation step can be determined on the basis of a difference between the setpoint value and the determined actual value and also on the basis of the control parameter. In the control step, the actuation step can be determined as the product of the difference and a proportionality factor that is dependent on the control parameter. This allows the actuation step to be chosen to be large when there is a large difference between the setpoint value and the actual value and small when there is only a small difference between the setpoint value and the actual value. The actuation step, which is used as an increment for the actuation value for the actuating element, is dependent on the parameter value of the control parameter for the corresponding control step. Since the parameter value is adapted, the dependency of the actuation step on the difference between the setpoint value and the actual value also changes. As a result, it is possible to take account of the fact that a prescribed increment in the actuation value for the actuating element has, on the basis of the properties of the luminaire and, if the actual value is sensed in reflection mode, on the basis of the reflection properties of the reference surface, a different influence on the change in the actual value that is brought about by the actuation step. Such different influences are depicted by the control parameter and automatically adjusted to suit the circumstances of the lighting system or the reference surface by the automatic adjustment.

For the automatic adjustment, the new parameter value of the control parameter can be determined on the basis of a difference between the second actual value and the first actual value and on the basis of the actuation step determined in the corresponding control step. Furthermore, the new parameter value of the control parameter can be determined on the basis of at least one old parameter value of the control parameter. The new parameter value of the control parameter, which is set following a prescribed control step, can be determined on the basis of the old parameter value of the control parameter, which was used for the prescribed control step, and also on the basis of the difference between the second actual value and the first actual value and on the basis of the actuation step determined in the prescribed control step.

The parameter value of the control parameter can be adjusted such that it estimates a difference between actual values from the sensor for a luminaire that is switched off and for maximum luminous flux from the luminaire. This can be achieved without this requiring the luminaire to be operated over the full brightness range.

For the method, a plurality of polling operations on a sensor can be performed between two successive control steps, in each case in order to determine the actual value. The number of the plurality of polling operations that are performed before the execution of the second control step of the two successive control steps may be dependent on a difference between an actual value determined in at least one of the plurality of polling operations and the setpoint value. Multiple repetitions of polling operations for the actual value from the sensor that are performed without a subsequent control step can be selectively aborted as soon as the actual value sensed in the last polling operation differs from the setpoint value by more than a threshold value. Multiple repetitions of polling operations for the actual value from the sensor that are performed without a subsequent control step can also be aborted following a maximum number in order to continue with the next control step. Hence, between control steps, it is possible for a subloop to be repeatedly executed in which only the actual value from the sensor is polled, but a control step does not follow immediately. The subloop can be executed until a maximum number of subloops is reached or in one of the subloops a discrepancy between the actual value and the setpoint value is established that exceeds a threshold value.

The selective execution of a complete control loop with measured value sensing, a control step and optional automatic adjustment of the parameter value of the control parameter or of the subloop allows the computation complexity to be reduced. The complete control loop needs to be executed only at greater intervals of time than successive sensor polling operations. A discontinuation criterion that is dependent on the difference between an actual value sensed in a subloop and the setpoint value allows a control step nevertheless to be reliably initiated when relatively large discrepancies occur between the actual value and the setpoint value.

The subloop also allows the monitoring of changes in the extraneous light influence between two successive control steps. Information about the change in the extraneous light influence before a control step can be used for a decision regarding whether automatic adjustment of the parameter value of the control parameter is meant to take place following the control step. The subloop also allows the first actual value and the second actual value, which are sensed before and following a control step and are used for adjusting the parameter value of the control parameter, to be determined at an interval of time that is shorter than an interval of time between control steps. This allows the quality of the adjustment of the parameter value to be increased.

On the basis of the actual values determined in the plurality of polling operations on the sensor, a change in the extraneous light influence can be estimated before the execution of the second control step of the two successive control steps. The automatic adjustment of the parameter value of the control parameter following the second control step can be performed selectively on the basis of a threshold value comparison of the change in the extraneous light influence.

A new parameter value of the control parameter does not need to be determined following every control step. Following a control step, a discrepancy between the second actual value, which is determined following the control step, and a computer estimation for the actual value, which computer estimation is determined on the basis of the parameter value used for the control parameter in the control step, can be determined. A new parameter value of the control parameter can be determined selectively on the basis of the discrepancy. The new parameter value of the control parameter can be determined when the discrepancy exceeds a threshold value. In this way, it is possible to suppress excessively frequent adjustment of the parameter value, for example in the case of measurement noise.

A new parameter value of the control parameter can be determined selectively on the basis of an adjustment criterion following a control step. By way of example, a new parameter value of the control parameter can be determined selectively only when the actuation step determined in the control step is greater than or at least equal to an actuation step threshold value.

As an alternative or in addition, the determination of a new parameter value of the control parameter can be made dependent on at least one prescribed period of time having elapsed between the luminaire being switched on and the control step. This allows the suppression of adjustment in phases in which the behavior of the luminaire can still change transiently.

As an alternative or in addition to each of the conditions cited in the preceding paragraphs, the determination of a new parameter value of the control parameter can be made dependent on a change in an extraneous light influence over time before the control step following which the adjustment is possibly meant to be performed being smaller than a further threshold value. This makes it possible to prevent quickly changing extraneous light influences from heavily influencing the difference between the second actual value, which is sensed following the control step, and the first actual value, which is sensed before the control step. Corruption of the parameter adjustment on account of severely changing extraneous light influences can thus be prevented.

As an alternative or in addition to each of the conditions cited in the preceding paragraphs, the determination of a new parameter value of the control parameter can be made dependent on a difference between the first actual value, which is determined before the control step, and the second actual value, which is determined following the control step, being larger than a measured value threshold value. The difference between the first actual value, which is determined before the control step, and the second actual value, which is determined following the control step, can be divided by the setpoint value, and the quotient determined in this manner can be compared with a further threshold value. Small changes in the actual value can be brought about by measurement fluctuations. The cited criterion allows constant adjustment of the parameter value of the control parameter in response to measurement fluctuations to be suppressed.

The new parameter value of the control parameter can be determined following a control step in each case on the basis of $$\frac{E_{Sensor}(n) - E_{sensor}(v)}{\Delta I}$$

In this case, $E_{Sensor}(v)$ denotes the first actual value, which is determined before the corresponding control step, $E_{Sensor}(n)$ denotes the second actual value, which is determined following the corresponding control step, and $\Delta I$ denotes the actuation step determined in the corresponding control step.

The new parameter value of the control parameter can be determined following a control step in each case on the basis of $$(1 - p) \cdot E_{Param}(\text{old}) + p \cdot \frac{E_{Sensor}(n) - E_{Sensor}(v)}{\Delta I}$$

In this case, $E_{Param}(\text{old})$ denotes the parameter value of the control parameter that was used in the control step for determining the actuation step, and p is a real number that satisfies $0 \leq p \leq 1$.

The new parameter value of the control parameter can be determined using different procedures on the basis of whether the difference between the first actual value and the second actual value will result in an increase or decrease in the parameter value of the control parameter. The new parameter value of the control parameter can be determined using different procedures on the basis of whether the condition $$\frac{E_{Sensor}(n) - E_{sensor}(v)}{\Delta I} > E_{Param}(\text{old})$$

is satisfied.

In the control step, the actuation step can be determined on the basis of $$\frac{E_{Setpoint} - E_{Sensor}(v)}{E_{Param}(\text{old})}$$

wherein $E_{Setpoint}$ is the setpoint value. This quotient can be discretized if only discrete or digital actuation values are admissible. In this case, the quotient can be rounded up in order to avoid a drop below the setpoint illuminance.

The new parameter value of the control parameter can be determined on the basis of a prescribed lower limit and a prescribed upper limit for the parameter value. The new parameter value can be set such that it is not lower than the lower limit and not higher than the upper limit.

An apparatus for regulating an illuminance comprises an input for receiving an actual value from a sensor, which is dependent on the illuminance to be regulated and which is intended to be regulated to a setpoint value, and an electronic computation device that is coupled to the input. The electronic computation device is set up to determine an actuation step for a luminaire on the basis of the actual value and a parameter value of a control parameter. The electronic computation device is set up to produce an actuation command on the basis of the actuation step. The electronic computation device is set up to determine a new parameter value of the control parameter on the basis of a first actual value, which is received before the corresponding control step, and a second actual value, which is determined following the corresponding control step, and to use the new parameter value of the control parameter for a subsequent control step.

The apparatus for regulating an illuminance may comprise a sensor that is coupled to the input and set up to provide the actual value for the input. The sensor is a light sensor. The apparatus may comprise a luminaire that is coupled to the electronic control device and set up to change an emitted light power on the basis of the actuation command in response to the actuation command.

The electronic computation device may be integrated in a luminaire module and/or an operating device, for example a ballast, of the luminaire. The apparatus may be embodied as an intelligent luminaire module in which the electronic computation device, the luminaire and the sensor are combined in one physical unit.

The apparatus may also be embodied as a pilot device that is separate from the luminaire and the sensor. The apparatus may be embodied as a central pilot device for a lighting system that outputs the actuation command to the luminaire via an interface. The interface may be coupled to a bus, for example a DALI bus.

A lighting system may comprise a plurality of luminaires, a plurality of sensors associated with the luminaries and the apparatus for regulating the illuminance. In this case, a respective control parameter may be provided for each luminaire. The regulation of the illuminance can be performed for each of the luminaires and associated sensors as described, and for each luminaire the parameter value of the control parameter associated with this luminaire can be adjusted on the basis of a difference between actual values that are sensed by the sensor associated with this luminaire before and following a control step for this luminaire.

The apparatus for regulating an illuminance may be embodied to perform the method according to the various exemplary embodiments.

Developments of the apparatus for regulating an illuminance and the respective effects attained thereby correspond to the developments of the method according to exemplary embodiments.

BRIEF DESCRIPTION OF THE DRAWINGS

Further features, effects and functions of exemplary embodiments of the invention will emerge from the detailed description that follows with reference to the appended drawings.

In the figures, identical or similar reference symbols denote identical or similar units or components. The features of the various exemplary embodiments can be combined with one another unless expressly barred in the description that follows.

DETAILED DESCRIPTION OF THE PREFERRED EMBODIMENTS

Figure 1:
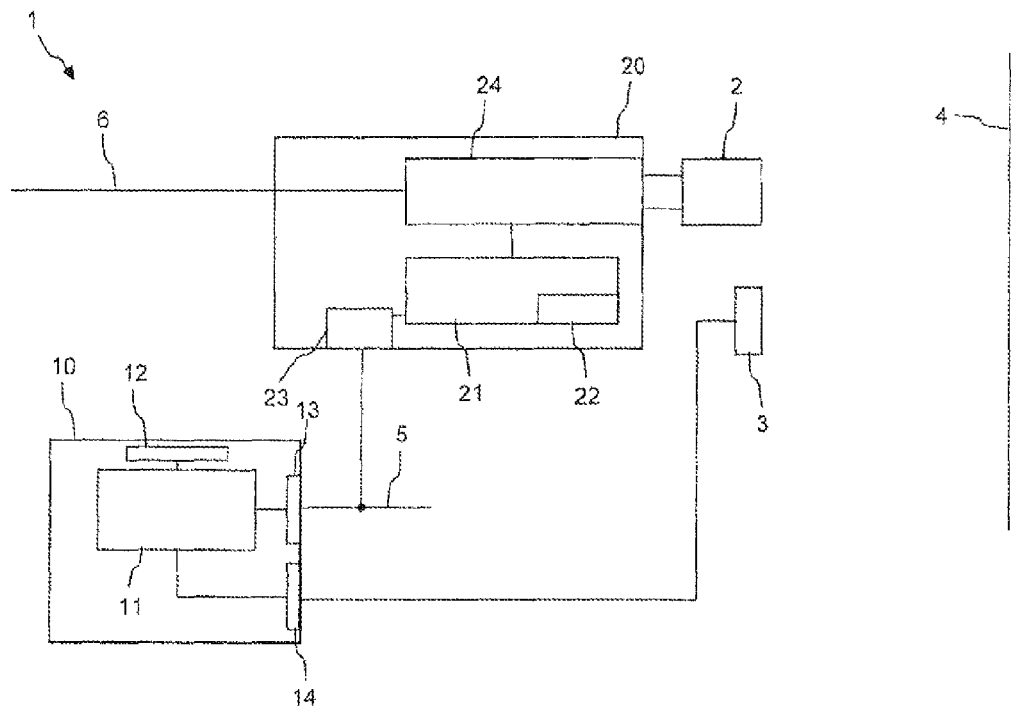
FIG. 1 is a schematic illustration of a lighting system with an apparatus for regulating an illuminance according to an exemplary embodiment.

FIG. 1 shows a lighting system 1 with an apparatus 10 for regulating an illuminance according to an exemplary embodiment. The lighting system 1 comprises a luminaire 2. By way of example, the luminaire 2 may be a gas discharge lamp or an LED-based luminaire. The lighting system 1 may comprise further luminaires. The luminaire 2 may have an associated operating device 20 for the luminaire 2. During operation, the luminaire 2 illuminates a reference surface 4. The illuminance of the reference surface 4 needs to be regulated. This is intended to achieve a prescribed illuminance even under variable extraneous light influences that involve light sources other than the luminaire 2 likewise shining light onto the reference surface 4.

The lighting system 1 comprises a sensor 3 that is embodied as a light sensor. The sensor 3 is arranged and embodied such that it senses light reflected and/or scattered by the reference surface 4. The reference surface 4 is present in the sensing range of the sensor 3. By way of example, the sensor 3 may be mounted in the same plane as the luminaire 2. As will be described in detail, the apparatus 10 is embodied as a regulator that outputs a respective actuation command to the luminaire 2 or to the operating device associated with the luminaire 2 in control steps. The actuation commands are produced in the control steps on the basis of an actual value that is sensed by means of the sensor 3. The determination of an actuation step involves taking account not only of the actual value sensed by means of the sensor 3 and the setpoint value but also of a parameter value of a control parameter. The parameter value is updated at least after some of the sequentially executed control steps. This involves observing how an actuation step by which the actuating element is actuated in a control step affects the actual value sensed by means of the sensor 3. A comparison of actual values sensed by means of the sensor 3 before and after the control step can be taken as a basis for adjusting the parameter value of the control parameter. The new, adjusted parameter value can be used in the next control step to determine the actuation step.

The introduction of a control parameter with an alterable parameter value and the adjustment of the parameter value of the control parameter allow self-learning adjustment of the apparatus 10 to the circumstances of the lighting system 1. The control parameter may be defined such that it quantifies the influence of a change in the actuation value for the luminaire 2 on the actual value that is sensed by means of the sensor 3 in response to the control step. This influence may be variable in real systems, for example on account of changing reflection properties of the reference surface 4, on account of aging of the luminaire 2, when a new luminaire 2 is fitted as a replacement for an old luminaire, or on account of partial failure of the luminaire 2. Such changes can be taken into account by the self-learning, adaptive adjustment of the parameter value of the control parameter, without this requiring maintenance in situ. The risk of creep or overshoot behavior when the illuminance is regulated can be reduced even if there is change in the influence that a change in the actuation value for the luminaire 2 has on the actual value that is sensed by means of the sensor 3 in response to the control step.

The luminaire 2 is embodied such that a radiated luminous power is variable on the basis of a received actuation command. To this end, by way of example, the operating appliance 20 may be provided, which receives and implements actuation commands. The operating device 20 may be embodied as a ballast. The operating appliance 20 is operated on the basis of actuation commands that the operating device 20 receives from the apparatus 10. The operating device 20 has an interface 23 that can be used for data communication with the apparatus 10. The data communication can take place by wire, for example via a bus 5, or wirelessly. The data communication may be digital data communication. The bus 5 may be a DALI bus, and commands can be produced on the basis of the DALI standard. Further operating devices may be connected to the bus 5. Commands received from the interface 23 are processed by a control device 21 that controls the operation of the operating device 20 on the basis of the received command. In this case, by way of example, a changeover process can take place, in which there is an advance toward the new actuation value with a changeover time that may be stored in a memory 22 or may be contained in the actuation command.

The operating device 20 may be embodied such that it allows intensity control for the luminaire 2. The operating device 20 is supplied with power via a supply line or supply lines 6. The operating device 20 has a circuit 24 in order to supply the luminaire 2 with power. The power supplied to the luminaire 2 and hence the luminous power emitted by the luminaire 2 can be controlled in various ways by means of the circuit 24. The control device 21 integrated in the operating device 20 controls the circuit 24 on the basis of a received actuation command in order to implement the actuation command. The actuation command that is produced by the apparatus 10 in order to actuate the luminaire 2 may contain an absolute actuation value, for example. The luminaire 2 or the operating device 20 associated with the luminaire implements the actuation command as appropriate, so that the luminaire 2 is set to the desired actuation value as an actuating element.

The apparatus 10 has a signal input 14 in order to poll the actual value of the illuminance sensed by the sensor. The apparatus 10 may have an interface 13 for outputting actuation commands. If the apparatus 10 is combined with the luminaire 2 in one physical unit, the interface 13 does not have to be an external interface. Similarly, the signal input 14 does not have to be an external port if the apparatus 10 is combined with the sensor 3 in one physical unit. The signal input 14 and the interface 13 may be combined in a single interface if the sensor also transmits actual values via the bus 5.

The apparatus 10 has an electronic computation device 11. The electronic computation device 11 may comprise one or more processors. The electronic computation device 11 may be embodied such that it takes a comparison between the actual value from the sensor and the setpoint value to which the illuminance is intended to be regulated as a basis for determining an actuation step by which the actuation value for the luminaire 2 needs to be altered. The electronic computation device 11 produces the corresponding actuation command for the luminaire 2 in a control step. The electronic computation device 11 may be embodied such that it continues to perform adjustment of the parameter value of the control parameter, as will be described in more detail. The various steps that the electronic computation device 11 performs for regulating the illuminance and for automatic parameter adjustment may be realized in hardware, software, firmware or a combination thereof. By way of example, the electronic computation device 11 may comprise a processor that executes command codes stored in a memory 12 in order to execute the methods according to various exemplary embodiments.

The operation of the apparatus 10 is described in more detail with reference to FIG. 2-10. While FIG. 1 schematically shows only one luminaire 2 and a sensor 3 associated with the luminaire 2, the methods and apparatuses for regulating an illuminance can accordingly also be used in a lighting system 1 having a plurality of luminaires. In this case, the adjustment of the parameter value of a control parameter, which will be described in more detail below, can be carried out separately for each of the plurality of luminaires using the methods described. Similarly, the determination of a new actuation value and the production of an actuation command in a control step can be carried out separately for each of the plurality of luminaires using the methods described.

In a control step, the apparatus 10 determines, in each case on the basis of a discrepancy between the setpoint value and the actual value, an actuation value correction that is forwarded to the luminaire or the operating device thereof. In this case, actuation commands with absolute actuation values can be produced, the change in the actuation value representing the actuation step. Alternatively, actuation commands with incremental changes in the actuation value can also be produced. The actuation step that is produced in order to determine the new absolute actuation value is dependent not only on the discrepancy between the setpoint value and the actual value but also on the parameter value of the control parameter.

The parameter value is adjusted automatically by the apparatus 10. The corresponding parameter adjustment is used as a self-learning correction procedure that adjusts the parameter value of the control parameter to suit the control results obtained.

Figure 2:
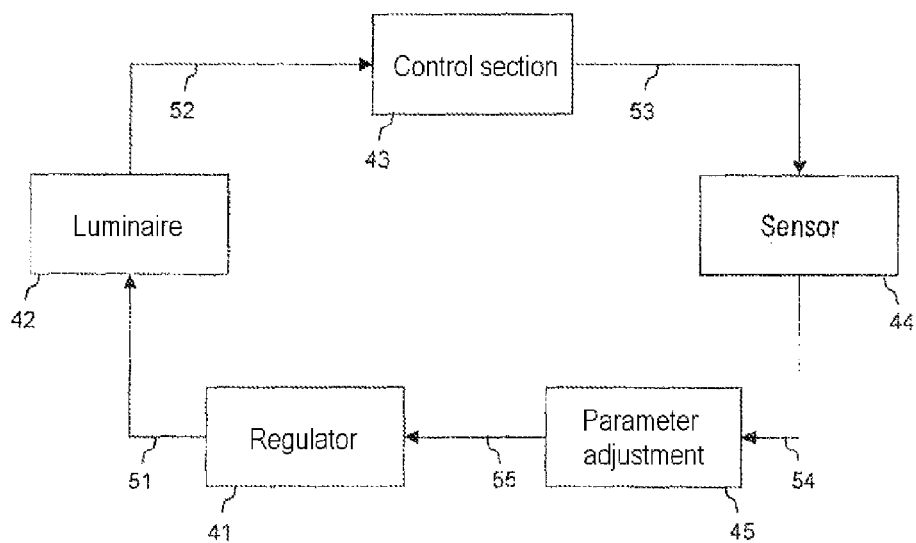
FIG. 2 schematically shows a control loop that can be executed for methods according to exemplary embodiments.

FIG. 2 schematically shows a control loop that can be executed for methods according to exemplary embodiments. In this case, the apparatus 10 is used as a regulator 41, which also performs the function of parameter adjustment 45.

The regulator 41 produces an actuation command 51 for a luminaire 42 that is used as an actuating element. The actuation command 51 may contain the new absolute actuation value. In order to perform a control step, the regulator 41 determines an actuation step for the luminaire 42 on the basis of the discrepancy between the setpoint value and the actual value and on the basis of the parameter value of the control parameter. The control parameter can determine a proportionality factor that the regulator 41 uses in order to convert the discrepancy between the setpoint value and the actual value into an actuation step that is determined in the control step.

The light emitted by the luminaire 42 is altered in accordance with the actuation command. This can be accomplished in a changeover process. The change in the setting acts on the control section 43, i.e. on the lighting in the room, at 52. The measuring element, which is embodied as a sensor 44, senses the action on the control section 43 at 53.

The sensor 44 delivers a new actual value at 54. The new actual value, which is sensed by the sensor 44, is used for parameter adjustment 45. In this case, the new actual value can be taken as a basis for determining whether the parameter value of the control parameter needs to be changed. If the parameter value of the control parameter does need to be changed, a new value of the control parameter is determined. The new parameter value of the control parameter is used by the regulator 41 in the subsequent control step, as shown schematically at 55.

The parameter adjustment 45 can be determined on the basis of a comparison between an alteration in the actual value, as forecast on the basis of the actuation value specification, and the alteration in the actual value that has actually occurred. If the forecast alteration in the actual value, determined by computer, differs from the alteration in the actual value that has actually occurred by more than an acceptable discrepancy, automatic adjustment of the parameter value of the control parameter is typically performed. Additional adjustment criteria can be checked in order to prevent adjustment of the parameter value of the control parameter under certain conditions or to perform it selectively only if the adjustment criterion is satisfied.

By way of example, the adjustment criterion can ensure that adjustment of the parameter value of the control parameter is not performed if the actual value that is sensed by the sensor 44 changes significantly after the last control step and before the next control step is performed. This allows a severe change in the extraneous light influence to be inferred, which could adversely affect the quality of the adjustment of the parameter value of the control parameter.

In order to identify changing extraneous light influences between two successive control steps, fresh execution of the control loop shown in FIG. 2 can be preceded by the single or repeated execution of a subloop in which only the actual value of the sensor is repeatedly polled and monitored, but neither a control step nor parameter adjustment is performed.

Figure 3:
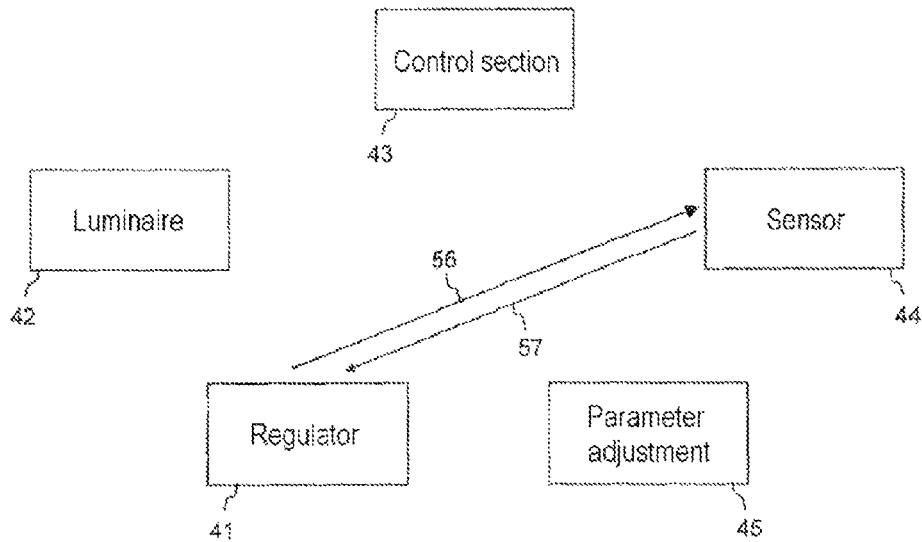
FIG. 3 shows a subloop of the control loop that can be executed repeatedly between control steps for methods according to exemplary embodiments.

FIG. 3 shows such a subloop that can be performed a single time or repeatedly between successive control steps.

In this case, the actual value from the sensor 44 is polled at 56. The actual value transmitted at 57 from the sensor 44 is monitored. A control step does not have to be performed after every polling operation for an actual value. No later than after a maximum number of successive polling operations without a subsequent control step, a control step can be performed again and in this regard the subloop can be prompted to execute the full control loop shown in FIG. 2. By way of example, up to five polling operations for the actual value can be performed between two successive control steps without a control step and parameter adjustment being executed between each of these operations.

For the purpose of monitoring the actual value from the sensor 44, the discrepancy between the determined actual value from the sensor and the setpoint value can be determined after every polling operation, for example. This discrepancy is denoted as $$\Delta E = E_{Setpoint} - E_{Sensor}, \quad (1)$$

wherein $E_{Setpoint}$ denotes the setpoint value and $E_{Sensor}$ denotes the actual value sensed by the sensor.

As soon as it is identified that the condition $$|\Delta E| > \Delta E_{max} \quad (2)$$

is satisfied, the subloop shown in FIG. 3 can be left and a control step can be performed. In this case, $\Delta E_{max}$ denotes a prescribed threshold value that defines the abortion criterion for successive subloops.

From the actual values that are determined for successive polling operations for the actual value between two control steps, it is possible to estimate an alteration in the extraneous light influence. The estimation for the alteration in the extraneous light influence can be used to determine, from subsequent execution of the full control loop from FIG. 2, whether a new parameter value of the control parameter needs to be determined for the parameter adjustment 45.

The subloop shown in FIG. 3 can be executed for methods and apparatuses of exemplary embodiments between control steps, but also be implemented in modified form or omitted.

Referring again to FIG. 2, a control step that the regulator 41 performs can prompt determination of an actuation step $\Delta I$ in each case on the basis of $$\Delta I = \frac{E_{Setpoint} - E_{Sensor}(v)}{E_{Param}(\text{old})}, \quad (3)$$

wherein $E_{Setpoint}$ is the setpoint value and $E_{Sensor}(v)$ is an actual value determined before the control step. The variable $E_{Param}(\text{old})$ denotes the parameter value of the control parameter that is used in the control step even before the parameter value is adjusted following the control step. The variable $E_{Param}(\text{old})$ was determined for the currently executed control step following a control step that precedes the control step. The actual value $E_{Sensor}(v)$ that is determined before the control step may be the last actual value polled before the control step. This most up-to-date actual value may have been determined during preceding execution of the full control loop, as shown in FIG. 2, or during execution of the subloop, as shown in FIG. 3.

The parameter value of the control parameter $E_{Param}(\text{old})$ that is used in equation (3) determines the proportionality factor between the actuation step and the discrepancy between the setpoint value and the actual value. The control parameter $E_{Param}(\text{old})$ that is used in equation (3) is an estimation for the change in the actual values that would be determined by the sensor at maximum power of the luminaire and when the luminaire is switched off.

A new actuation value for the luminaire 2 can be determined from the old actuation value $I_{real}(\text{old})$ before the control step is performed and from the actuation step indicated in equation (3). This can be done in various ways. By way of example, a value $$I_{Setpoint} = I_{real}(\text{old}) + \frac{E_{Setpoint} - E_{Sensor}(v)}{E_{Param}(\text{alt})} \quad (4)$$

can be calculated first of all. To stipulate the new actuation value, various additional steps can be performed. By way of example, it is possible to perform a comparison with an admissible value range of actuation values in order to ensure that the new actuation value is within the admissible value range.

By way of example, a new actuation value that is transmitted to the luminaire in the control step can be determined as $$I_{real}(\text{new}) = \begin{cases} I_{max} & \text{if } I_{Setpoint} > I_{max} \\ I_{Setpoint} & \text{if } I_{min} \leq I_{Setpoint} \leq I_{max} \\ I_{min} & \text{if } I_{Setpoint} > I_{max} \end{cases} \quad (5)$$

It is possible for discretization or digitization of the variable $I_{real}(\text{new})$ to be performed if only discrete or digital actuation values are admissible.

Following the control step, a further actual value from the sensor is polled. This is denoted by $E_{Sensor}(n)$ below. The actual value $E_{Sensor}(n)$ that is determined following the control step may be the first actual value polled after the control step. This actual value can be determined during execution of the full control loop, as shown in FIG. 2, or during execution of the subloop, as shown in FIG. 3. If the luminaire 2 advances toward the new actuation value in a changeover process, the actual value $E_{Sensor}(n)$ can be polled following the conclusion of the changeover process.

The actual value $E_{Sensor}(n)$ that is determined after the control step can be compared with an estimation for the actual value that is expected in response to the control step. Such an estimation $E_{Sensor}(\text{exp})$ can be calculated as $$E_{Sensor}(\text{exp}) = E_{Sensor}(v) + \Delta I \cdot E_{Param}(\text{old}). \quad (6)$$

On the basis of the difference between the true actual value $E_{Sensor}(n)$ and the estimation $E_{Sensor}(\text{exp})$, it is possible to perform parameter adjustment in which a new parameter value of the control parameter is determined.

The parameter adjustment can be executed in different ways. In this case, the new parameter value of the control parameter can be determined on the basis of $$\frac{E_{Sensor}(n) - E_{Sensor}(v)}{\Delta I}, \quad (7)$$

wherein $\Delta I$ denotes that actuation step that has been determined in the control step before which the actual value $E_{Sensor}(v)$ has been determined and after which the actual value $E_{Sensor}(n)$ has been determined.

In one embodiment of apparatuses and methods, the new parameter value $E_{Param}(\text{new})$ of the control parameter can be calculated following a control step as $$E_{Param}(\text{new}) = (1-p) \cdot E_{Param}(\text{old}) + p \cdot \frac{E_{Sensor}(n) - E_{Sensor}(v)}{\Delta I}, \quad (8)$$

wherein $E_{Param}(\text{old})$ is the parameter value of the control parameter that has been used in the control step to determine the actuation step $\Delta I$, and p is a real number that satisfies $0 \leq p \leq 1$. In particular, the new parameter value $E_{Param}(\text{new})$ of the control parameter can be determined on the basis of equation (8), wherein $0 < p < 1$ is satisfied.

In a further embodiment of apparatuses and methods, the new parameter value $E_{Param}(\text{new})$ of the control parameter can be determined using different procedures following a control step on the basis of whether the difference between the first actual value and the second actual value will result in an increase or decrease in the parameter value of the control parameter. The new parameter value of the control parameter can be determined as $$E_{Param}(\text{new}) = (1-q) \cdot E_{Param}(\text{old}) + q \cdot \frac{E_{Sensor}(n) - E_{Sensor}(v)}{\Delta I}, \quad (9)$$

if the condition $$\frac{E_{Sensor}(n) - E_{Sensor}(v)}{\Delta I} > E_{Param}(\text{old}) \quad (10)$$

is satisfied. The new parameter value of the control parameter can be determined as $$E_{Param}(\text{new}) = (1-p) \cdot E_{Param}(\text{old}) + p \cdot \frac{E_{Sensor}(n) - E_{Sensor}}{\Delta I} \quad (11)$$

if the condition $$\frac{E_{Sensor}(n) - E_{Sensor}(v)}{\Delta I} \leq E_{Param}(\text{old}) \quad (12)$$

is satisfied. Like p, q is a real number.

In a further embodiment, the new parameter value $E_{Param}(\text{new})$ of the control parameter, as determined according to equation (8) or as determined according to equations (9)-(12), can be corrected such that it is within a prescribed value range. To this end, by way of example, the new parameter value $E_{Param}(\text{new})$ of the control parameter can be set to a value $E_{Param}(\text{max})$ if the new parameter value $E_{Param}(\text{new})$ determined according to equation (8) or determined according to equations (9)-(12) is greater than $E_{Param}(\text{max})$. The new parameter value $E_{Param}(\text{new})$ of the control parameter can be set to a value $E_{Param}(\text{min})$ if the new parameter value $E_{Param}(\text{new})$ determined according to equation (8) or determined according to equations (9)-(12) is less than $E_{Param}(\text{min})$. In all other cases, the new parameter value $E_{Param}(\text{new})$ determined according to equation (8) or determined according to equations (9)-(12) can be maintained.

If only discrete values are admitted for the new parameter value $E_{Param}(\text{new})$, the parameter value $E_{Param}(\text{new})$ determined in this manner can be discretized such that it has one of the admissible discrete values.

When a control loop as shown in FIG. 2 is next executed, the new parameter value $E_{Param}(\text{new})$ determined following the control step is used to determine the actuation step in the subsequent control step. In the terminology of equations (3)-(12) above, this is accomplished by first of all setting $$E_{Param}(\text{old-next step}) = E_{Param}(\text{new}) \quad (13)$$

for the subsequent control step in order to achieve the effect that the "old" parameter value of the control parameter, as used in the next control step, on the left-hand side of equation (13) assumes the value determined as the "new" parameter value of the control parameter in the earlier control step, which value is on the right-hand side of equation (13). The control step and the adjustment of the parameter value of the control parameter can then be performed again as described with reference to equations (3)-(12).

Figure 4:
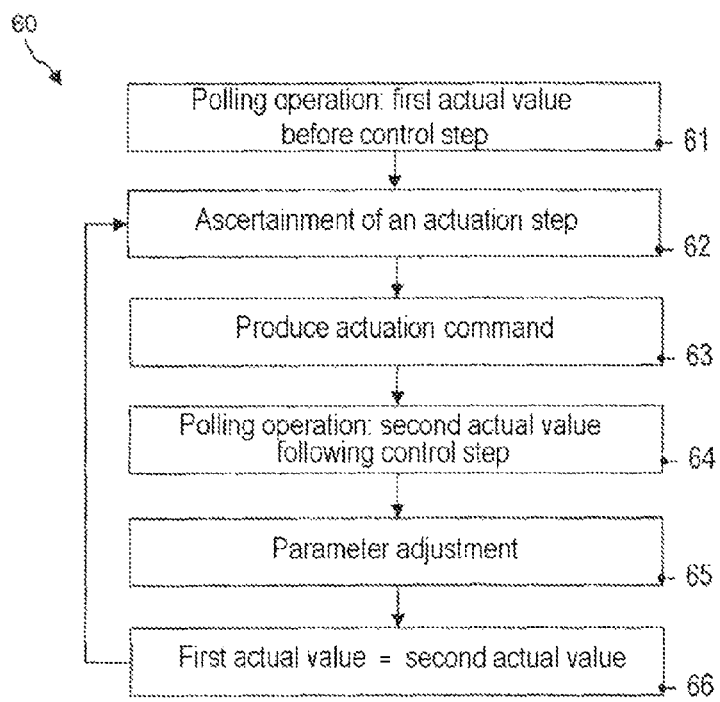
FIG. 4 shows a flowchart of a method according to an exemplary embodiment.

FIG. 4 is a flowchart for a method 60 according to an exemplary embodiment. The method 60 can be executed automatically by the apparatus 10 of the lighting system 1. The method 60 contains regulation of an illuminance on the basis of the discrepancy between the actual value from a sensor and setpoint value and on the basis of a parameter value of a control parameter. In addition, the method 60 contains parameter adjustment, in which the parameter value of the control parameter can be adjusted in any case after some of the control steps.

At 61, a first actual value from a sensor is polled before a control step is performed.

At 62, an actuation step by which the actuation value for the luminaire needs to be changed is determined. The actuation step can be determined on the basis of the discrepancy between the first actuation value from the sensor and the setpoint value. The actuation step can be determined as the product of the discrepancy and a proportionality factor that is dependent on the parameter value of the control parameter. The proportionality factor may be the inverse of the parameter value of the control parameter.

At 63, an actuation command is produced on the basis of the determined actuation step. The actuation command may contain a new actuation value or indicate the new actuation value in another way. The new actuation value can be determined as described with reference to equations (4) and (5). The new actuation value can be produced such that it is selected from an admissible value range for actuation values.

At 64, a second actual value from the sensor is polled after the actuation command has been produced and has been implemented by the luminaire. If the luminaire undergoes a changeover process, the second actual value can be polled after the end of the changeover process. To this end, an interval of time between polling operations for actual values from the sensor can be chosen to be greater than the changeover time, for example.

At 65, a procedure for parameter adjustment is introduced. The procedure may comprise the checking of an adjustment criterion in order to determine whether the parameter value of the control parameter needs to be adjusted following the control step executed at 62 and 63. The procedure for parameter adjustment may comprise, at least after some of the control steps, changing the parameter value of the control parameter from an old parameter value, which was used for the preceding control step at 62 and 63, to a new parameter value, which needs to be used for the subsequent control step.

Method steps 61-65 can then be executed again. The second actual value from the sensor, as polled at 64 following the control step, can be used for actuation value calculation for the subsequent control step. To this end, at 66, the second actual value determined at 64 can be copied as appropriate into a value field for the actual value that is used for determining the next actuation step. As an alternative or in addition, a plurality of sensor polling operations can be performed between successive control steps, said sensor polling operations being followed by the next sensor polling operation without a control step executed in between and without parameter adjustment executed in between. It is then expediently possible for that actual value from the sensor that was polled most recently before an actuation step to be used for the next control step. Control steps in which an actuation step is determined and an actuation command corresponding to the new actuation value is produced can be initiated, by way of example, when a discrepancy between the actual value and the setpoint value is established that is no longer in a tolerance band and/or when a prescribed firm maximum number of sensor polling operations have been performed without a subsequent control step.

The parameter adjustment that is performed at 65 rates the quality of the control step and adapts the control method if need be such that the parameter value of the control parameter more accurately depicts the actual behavior of the actuating element and the control section. The effect that can be achieved by this is that a small number of actuation commands can be used to regulate the actual value to a particular value range even in the case of relatively large discrepancies between the actual value and the setpoint value.

Figure 5:
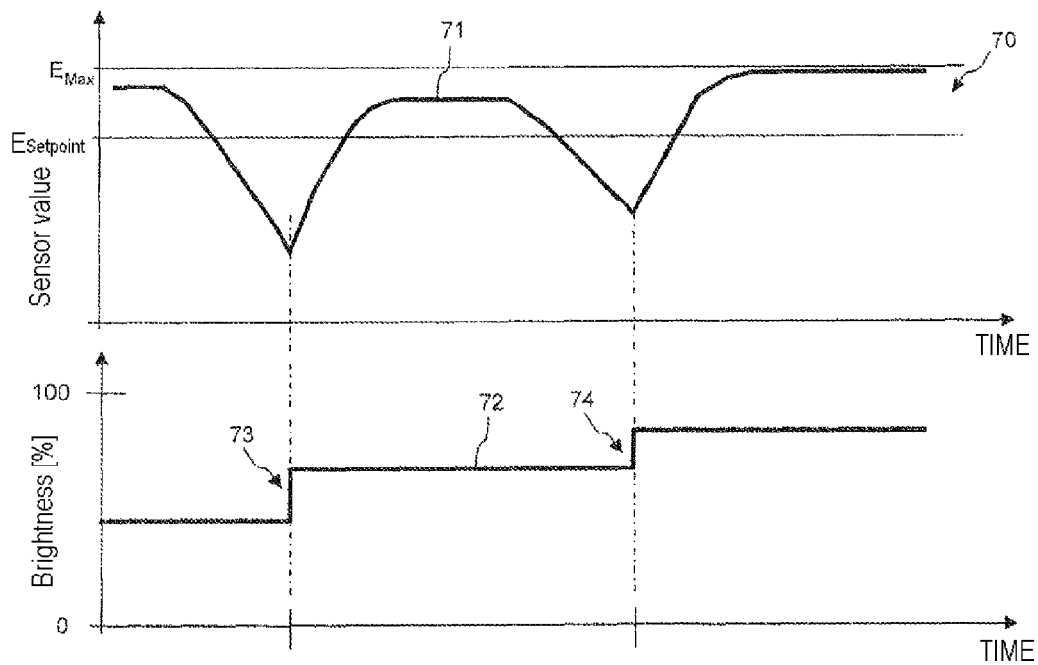
FIG. 5 illustrates the mode of action of control steps for methods according to exemplary embodiments.

FIG. 5 illustrates the performance of a plurality of control steps for methods according to exemplary embodiments when the parameter value of the control parameter has already been adjusted such that it provides a good depiction of the actual behavior of the luminaire as an actuating element and of the control section.

The actual value from the sensor, which is polled as a sensor signal 71, needs to be put into a value range 70 by the regulating system. Said value range may have the setpoint value $E_{Setpoint}$ as a lower limit and a maximum value $E_{Max}$ as an upper limit. The maximum value $E_{Max}$ may be a firm percentage, for example 3%, above the setpoint value $E_{Setpoint}$.

The actuation value 72 for the luminaire, which determines the light intensity emitted by the luminaire, is set to new actuation values in respective control steps. By way of example, the actuation value can define a value for a dimming curve or can indicate the relative brightness in another way. In a control step 73, the actuation value is increased. This may become necessary, by way of example, if the illuminance sensed decreases as a result of a reduction in the illuminance by extraneous light, e.g. as a result of the sun being shaded by a cloud, or as a result of a reduction in the reflection of the reference surface. The subsequent changeover process takes the actual value sensed by the sensor back into the value range 70.

Similarly, in a subsequent control step 74, the actuation value can be increased once again, for example if the extraneous light on the reference surface is reduced further and the actual value decreases accordingly.

On account of the adjustment of the parameter value of the control parameter such that the actual change in the actual value corresponds to the predicted change, the actual value can be put back into the value range 70 by a small number of actuation commands. If the alteration in the actual value that is observed in the sensor signal 71 in response to an actuation command does not lead to the desired result and, in particular, the new actual value obtained in response to an actuation command differs from an estimation for the new actual value by more than a tolerable discrepancy after the end of a changeover process, the parameter value of the control parameter can be adjusted accordingly.

Figure 6:
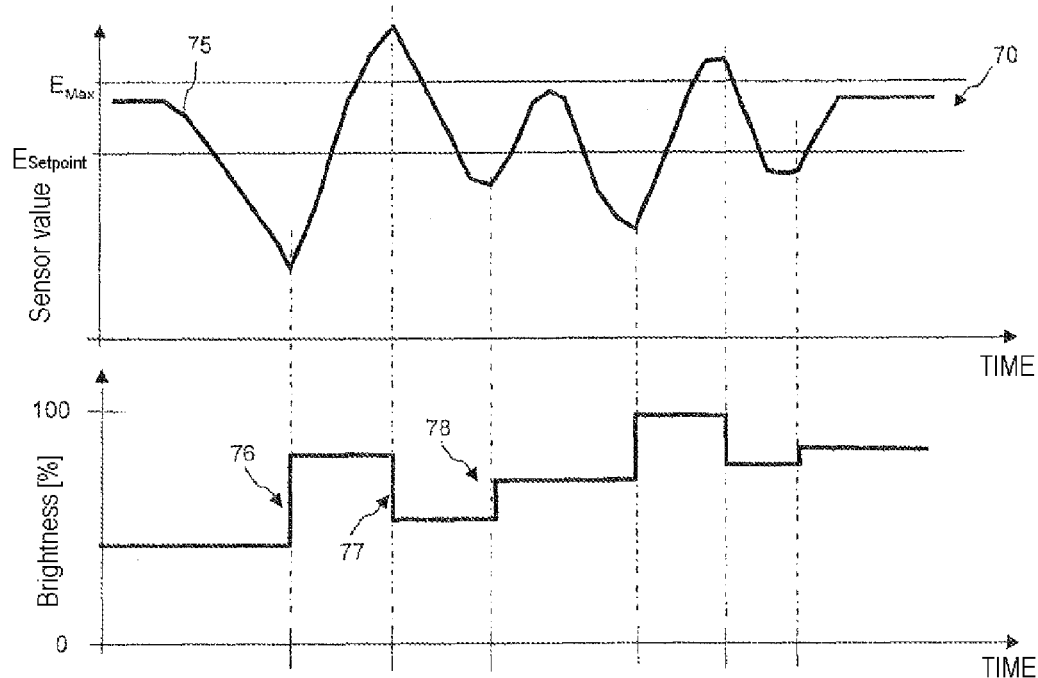
FIG. 6 illustrates the mode of action of control steps if a parameter value of a control parameter has not yet been adjusted.

FIG. 6 illustrates the performance of a plurality of control steps for methods in which the parameter value of the control parameter is originally set such that it does not yet provide a good depiction of the actual behavior. In the case of the profile of the sensor signal and actuation value that is shown by way of example, the influence that a particular actuation step has on the actual value is underestimated, that is to say that the parameter value of the control parameter $E_{Param}(old)$ in the equation (3) is too small. Such a case may arise, by way of example, after an old luminaire has been replaced by a new luminaire, or after a luminaire with relatively low maximum power has been replaced by a luminaire with higher maximum power.

Owing to the initial mismatch in the parameter value of the control parameter, the new actuation value that is produced and output in a control step 76 in order to compensate for excessively low illuminance results in an overshooting behavior from the sensor signal 75. For correction purposes, new actuation commands need to be produced in further control steps 77 and 78.

The overshooting behavior or overshoot on account of the initial mismatch in the parameter value of the control parameter is automatically identified in the case of methods according to exemplary embodiments. The parameter value of the control parameter is automatically adapted such that it better depicts the real behavior of the lighting system after a few control steps. As a result, it is possible to achieve regulation as shown in FIG. 5 in which the risk of overshoot behavior or creep behavior is reduced.

Figure 7:
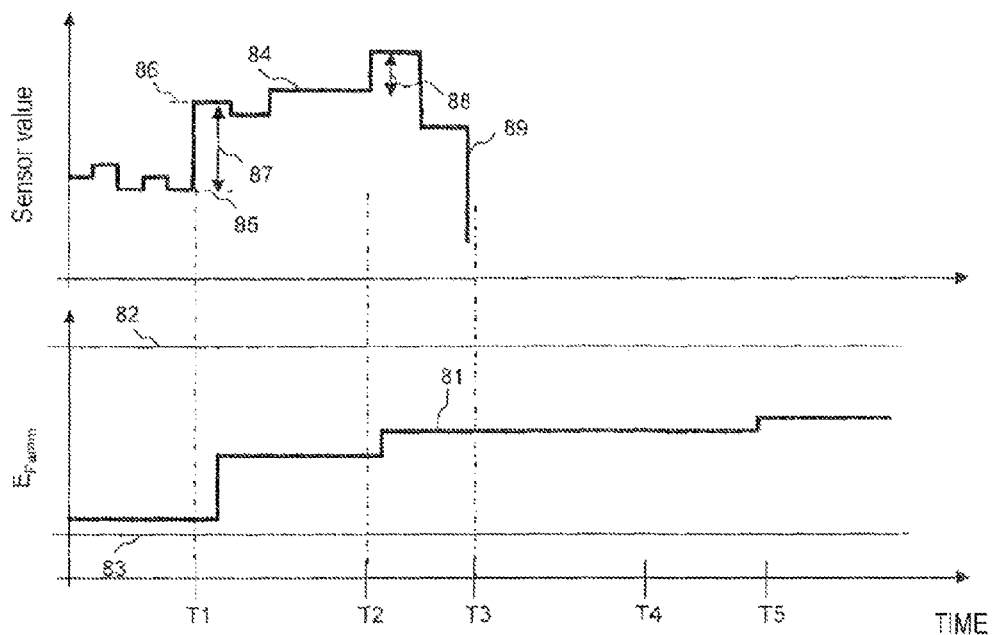
FIG. 7 illustrates parameter adjustment for methods according to exemplary embodiments in which a parameter value of a control parameter is adaptively adjusted during the control loop pass.

FIG. 7 illustrates the adjustment of the parameter value of the control parameter. The parameter value 81 of the control parameter is shown as a function of time. The parameter value 81 of the control parameter can be changed selectively in each case after a control step. Control steps are executed at times T1, T2, T3, T4 and T5, with in each case a corresponding actuation command being output in order to set a new actuation value for the luminaire as actuating element.

The actual value of the sensor, the time profile of which is shown at 84, is sensed before and after the respective control step. If the luminaire assumes the new actuation value in a changeover process, the actual value from the sensor can be used at the end or after the end of the changeover process to rate the quality of the parameter value used for the control parameter in the control step.

In response to a control step that is performed at the time T1, the actual value from the sensor changes from a first actual value 85 to a second actual value 86. A difference 87 in the actual values can be compared with the sudden change in the actual value that is expected for the old parameter value of the control parameter. In the example illustrated, the parameter value of the control parameter is initially too small, which can result in an overshooting behavior, as illustrated in FIG. 6.

The mismatch in the parameter value of the control parameter is automatically identified after the control step at the time T1. To this end, the difference 87 can be set in relation to the actuation step that was used in the control step at T1. By way of example, a new parameter value of the control parameter can be determined on the basis of the procedures described with reference to equations (8) to (12).

Similarly, the control step performed at T2 results in the actual value from the sensor changing from a first actual value to a second actual value. A difference 88 in the actual values can be compared with the sudden change in the actual value that is expected for the old parameter value of the control parameter. A corresponding increase in the parameter value of the control parameter takes place.

For the change in the parameter value of the control parameter, it is possible, if need be, to take into account that the parameter value of the control parameter needs to be in a prescribed value range between a lower limit 83 and an upper limit 82.

A change in the parameter value of the control parameter does not need to be performed after every control step. As soon as the parameter value of the control parameter has been adjusted such that it provides a good description of the actual behavior of the lighting system, a change in the parameter value of the control parameter will be necessary only rarely. In particular, an old value of the parameter value of the control parameter that was used for a control step can also be used for the subsequent control step if a comparison of the change in the actual values that has occurred in response to an actuation command exhibits a good match with the behavior predicted on the basis of the old value of the parameter value of the control parameter.

As an alternative or in addition, it is possible to use further criteria that are used to determine whether it is necessary to change the parameter value of the control parameter. By way of example, it is selectively possible for no new parameter value of the control parameter to be determined if the luminaire is still in a switch-on phase and/or if the actuation step that was determined in the control step was small. A further criterion, which can be checked as an alternative or in addition, involves the change or rate of change of the actual value from the sensor between two control steps. Such a change is not caused by a change in the actuation value for the luminaire but rather can indicate a changing extraneous light influence. In such a case, there is the risk of a difference in the actual values that are sensed before and after a control step being able to be substantially influenced by variations in the extraneous light influence over time. A change in the parameter value of the control parameter can accordingly be selectively prevented if the actual value from the sensor changes greatly before a control step despite a constant actuation value for the luminaire.

FIG. 7 schematically shows a severe drop in the illuminance as an edge 89 in the sensor value. This drop is detected in the subloop shown in FIG. 3, for example, and results in the performance of a control step at T3. However, a new parameter value for the control parameter is not determined after the control step at T3, since the drop in the actual value at the edge 89 indicates that a changing extraneous light influence could adversely affect the quality of a new parameter value of the control parameter during the control step. As explained with reference to FIG. 2 and FIG. 3, information about a change in the extraneous light influence is available from a plurality of sensor polling operations, for example, that are performed in succession between successive control steps.

Figure 8:
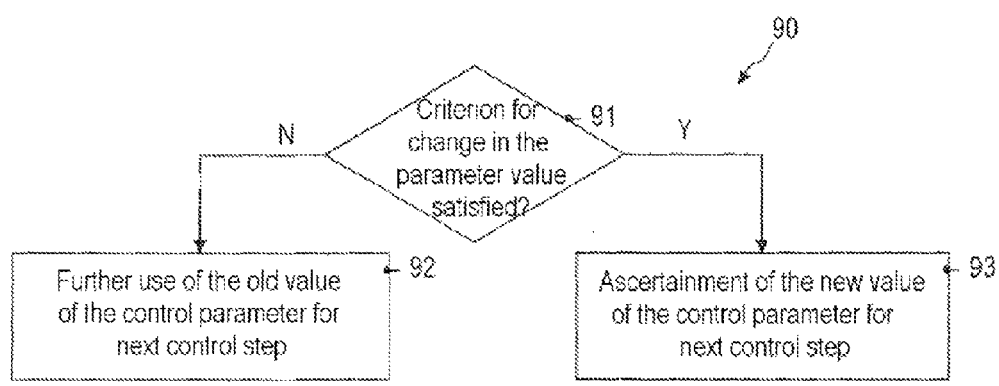
FIG. 8 illustrates an implementation of parameter adjustment for methods according to exemplary embodiments.

FIG. 8 illustrates a procedure 90 for the parameter adjustment, as can be executed on element 45 of the control loop in FIG. 2 or at step 66 of the method in FIG. 4.

At 91, a check is performed to determine whether a criterion for a change in the parameter value is satisfied. The check at 91 can be performed on the basis of whether the change in the actual value from the sensor that is observed in response to a control step matches an estimation that is determined on the basis of the old parameter value of the control parameter that was used in the corresponding control step for determining the new actuation value.

If the criterion for a change in the parameter value is not satisfied, the parameter value of the control parameter that was used in the last control step is also used in the subsequent control step at 92.

If the criterion for a change in the parameter value is satisfied, a new parameter value of the control parameter is determined at 93. The new parameter value can be determined on the basis of the change in the actual value from the sensor that has been identified in response to the control step. The new parameter value can be determined as described with reference to equations (8) to (12).

Alternative or additional criteria can be used to determine whether a new parameter value of the control parameter needs to be determined.

Figure 9:
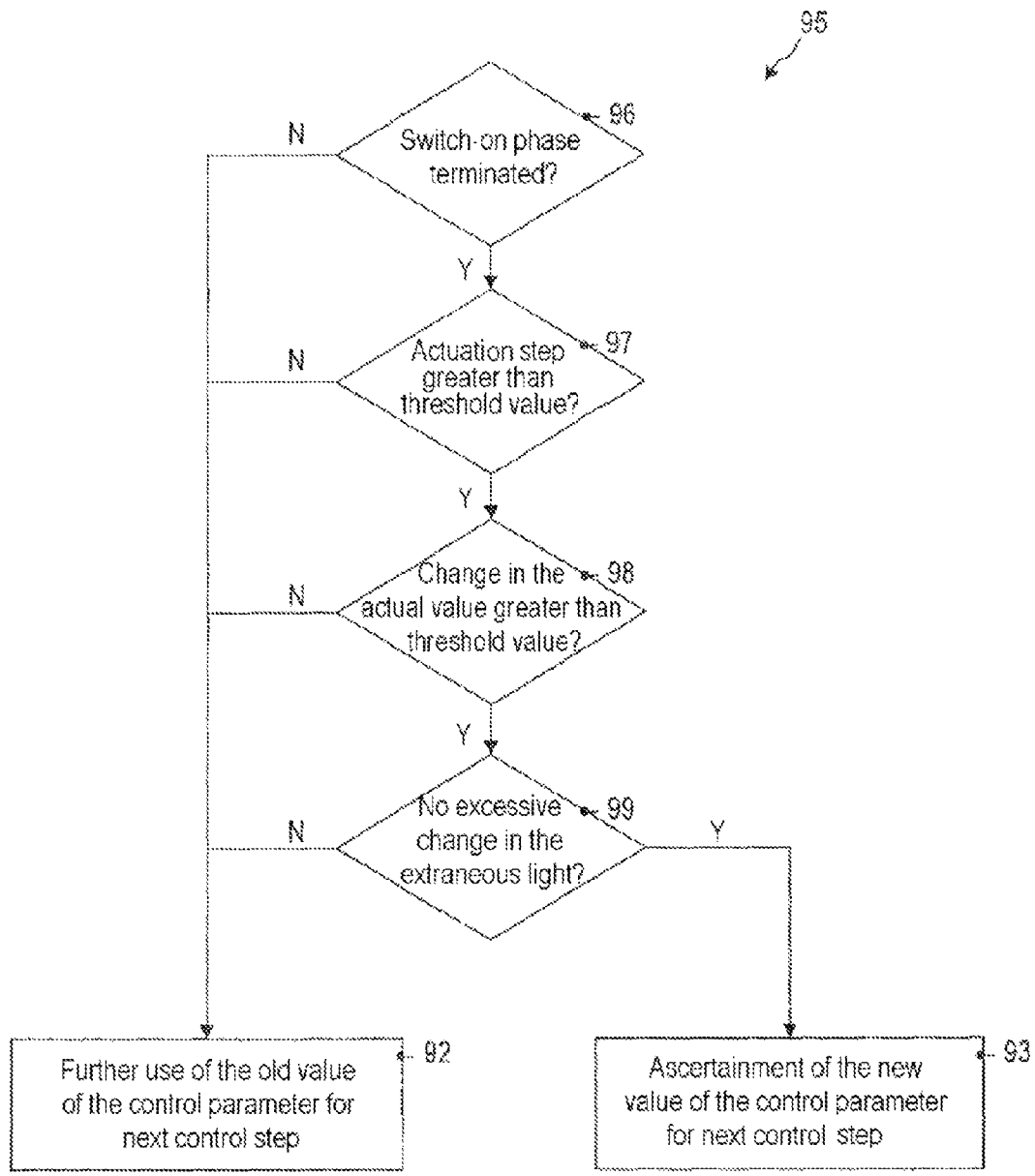
FIG. 9 illustrates an implementation of parameter adjustment for methods according to exemplary embodiments.

FIG. 9 illustrates a procedure 95 for the parameter matching, as can be executed on element 45 of the control loop in FIG. 2 or at step 66 of the method in FIG. 4. In this case, a plurality of criteria that preclude the determination of a new parameter value of the control parameter are checked cumulatively.

At 96, a check is performed to determine whether the luminaire is still in a switch-on phase. To this end, a period since the luminaire was switched on can be compared with a prescribed time threshold value. If the prescribed time threshold value has not yet been reached, a change in the parameter value of the control parameter can be suppressed, even if the change in the actual value for the sensor that has been observed in response to the preceding control step does not yet exhibit a good match with a computer estimation. This makes it possible to prevent the parameter value of the control parameter from being adjusted to suit just a transient response from the luminaire. If the prescribed time threshold value has not yet been reached, the procedure moves to step 92 and uses the old parameter value of the control parameter for the subsequent control step too. Otherwise, the procedure continues at 97.

At 97, the actuation step ΔI that was used in the preceding control step can be compared with an actuation step threshold value. The comparison can be taken as a basis for suppressing a change in the parameter value of the control parameter, even if the change in the actual value from the sensor that was observed in response to the preceding control step does not yet exhibit a good match with an estimation. By way of example, the procedure can move to step 92 and can use the old parameter value of the control parameter for the subsequent control step too if the condition $$\Delta I < \Delta I_{max} \quad (14)$$

is satisfied. This allows the risk of instabilities to be reduced for the change in the parameter value of the control parameter. If the condition of equation (14) is not satisfied, the procedure continues at 98.

At 98, it is possible to check whether the change in the actual value that has been observed in response to the control step is greater than a further threshold value or at least equal to a further threshold value. To this end, it is possible to determine whether the condition $$\left| \frac{E_{Sensor}(n) - E_{Sensor}(v)}{E_{Setpoint}} \right| \geq \Delta E_{min} \quad (15)$$

is satisfied. If the condition according to equation (15) is not satisfied, measured value fluctuations can have a greater influence on the change in the actual value that occurs in response to the control step. In order to suppress excessively frequent adjustment of the parameter value of the control parameter in response to measured value fluctuations, the procedure can move to step 92 and can use the old parameter value of the control parameter for the subsequent control step too if the condition according to equation (15) is not satisfied. Otherwise, the procedure continues at 99.

At 99, it is possible to check whether the actual value has changed greatly in the case of a plurality of successive polling operations for the actual value that have been performed before the control step. As a result, it is possible to identify, by way of example, whether a severe daylight change could corrupt a new parameter value of the control parameter. To this end, it is possible for the difference between two actual values from the sensor that are determined in successive polling operations, and between which the actuation value has not changed, to be compared with a further threshold value. The condition $$|E_{Sensor}(v1) - E_{Sensor}(v2)| > tl_{max} \quad (16)$$

can be checked, wherein $E_{Sensor}(v1)$ and $E_{Sensor}(v2)$ are the two actual values from the sensor that are determined in successive polling operations without the actuation value for the luminaire having changed in between. If the condition according to equation (16) is satisfied, this indicates a more severe change in the extraneous light, and the procedure can move to step 92 and use the old parameter value of the control parameter for the subsequent control step too. Otherwise, the new parameter value of the control parameter is calculated at step 93.

While various criteria need to be cumulatively satisfied for the procedure 95 in order for a new parameter value of the control parameter to be calculated, it is also possible for other or just some of the criteria described with reference to FIG. 8 and FIG. 9 to be applied. The criteria explained with reference to the procedure 95 can also be checked in other subcombinations or on their own.

As an alternative or in addition to the criteria described with reference to FIG. 8 and FIG. 9, it is possible to check further criteria, on the basis of which an assessment is made regarding whether the parameter value of the control parameter needs to be adjusted.

By way of example, in exemplary embodiments, it is possible for the control parameter not to be adjusted if the measured actual value has decreased following an increase in the actuation value or if the measured actual value has increased following a decrease in the actuation value. It is possible for the parameter value of the control parameter not to be adjusted if one of the two following conditions according to equation (17) or equation (18) is satisfied:

$$E_{Sensor}(n) > E_{Sensor}(v) \text{ and } \Delta I \leq 0, \text{ or}$$

$$E_{Sensor}(n) < E_{Sensor}(v) \text{ and } \Delta I \geq 0. \quad (17), (18)$$

The check to determine whether one of the conditions according to equation (17) or equation (18) is satisfied can be made in addition to one or more of the criteria described with reference to FIG. 8 and FIG. 9. A criterion for the suppression of adjustment of the parameter value of the control parameter may therefore be dependent on a comparison of an arithmetic sign of the actuation value and an arithmetic sign of the resultant change in the actual value.

Figure 10:
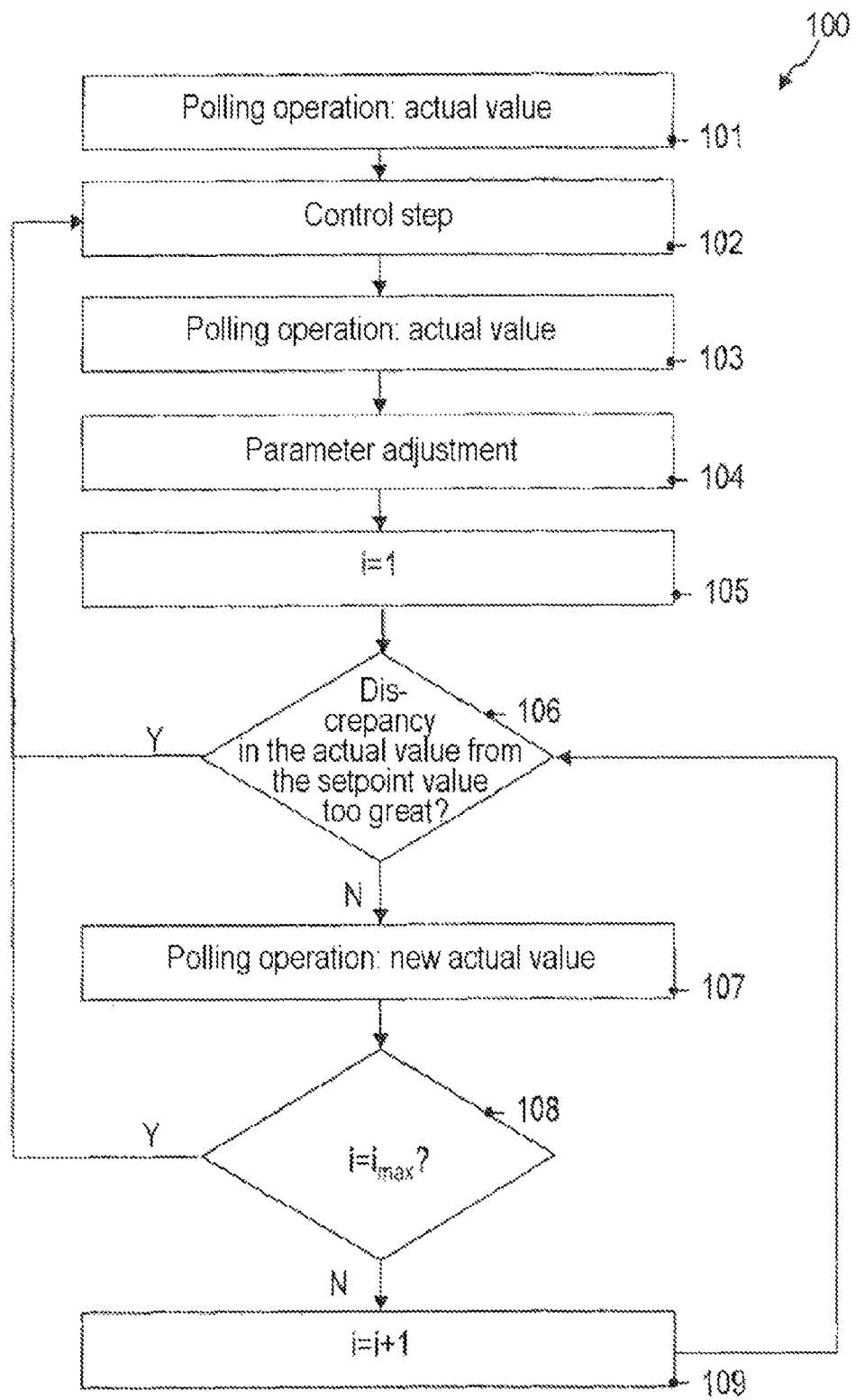
FIG. 10 is a flowchart of a method according to an exemplary embodiment.

FIG. 10 is a flowchart for a method 100 according to an exemplary embodiment. The method 100 can be executed automatically by the apparatus 10 of the lighting system 1.

At 101, an actual value from a sensor is polled.

At 102, a control step is performed. This involves the determination of a new actuation value for a luminaire on the basis of a discrepancy between the actual value polled at 101 and a setpoint value and also on the basis of the parameter value of the control parameter. An actuation command is produced in accordance with the new actuation value.

At 103, an actual value is again determined in a further polling operation on the sensor following the control step.

At 104, parameter adjustment is performed. The parameter adjustment can be performed as described with reference to FIG. 1-10. In particular, at 104, the difference in the actual values determined at 102 and 103 can be used to determine how well the parameter value of the control parameter describes the behavior of the system. Selective determination of a new parameter value of the control parameter for the next actuation step is possible.

In the subsequent steps 105-109, the subloop shown in FIG. 3 for the control loop can be executed a single time or repeatedly. In this case, the actual value from the sensor is polled without a new actuation step being calculated.

At 105, an iteration via subloops can be initialized. A count index i can be set to an initial value.

At 106, a check is performed to determine whether the most recently polled actual value from the sensor has a discrepancy from the setpoint value that is greater than a threshold value. If the discrepancy is greater, the next control step can immediately be performed at 102. Otherwise, a further actual value from the sensor is polled at 107 without an actuation command being produced and output to the luminaire beforehand.

At 108, a check is performed to determine whether a prescribed maximum number of repetitions of polling operations for the actual value has been reached without a subsequent control step. If a number $i_{max}$ of repetitions has been reached, a control step is performed at 102. Otherwise, the count index is incremented at 109. The method returns to the check at 106.

As a result of the performance of sensor polling operations in combination with monitoring of the discrepancy between the actual value and the setpoint value, as shown at 106, the computation complexity as a result of superfluous actuation steps can be reduced and a good reaction response to changes in the illuminance that occur can be achieved. Furthermore, information about changes in the illuminance that occur between successive control steps and are not caused by a new actuation value for the luminaire is thus obtained. This information can be used to determine whether a new parameter value of the control parameter can be determined when a control step is executed again.

While exemplary embodiments have been described in detail, modifications can be realized for further exemplary embodiments. By way of example, a lighting system may comprise a plurality of luminaire modules that are coupled to the same apparatus for the purpose of regulating the illuminance. As an alternative or in addition, each of a plurality of luminaire modules may be embodied as an intelligent luminaire module that comprises internal logic that performs the functions of the electronic computation device 11 of the apparatus 10.

Figure 11:
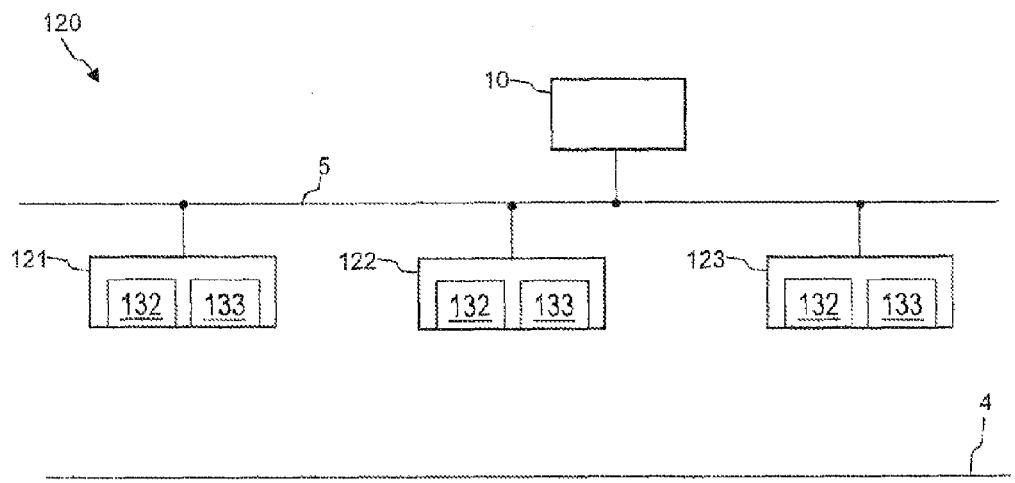
FIG. 11 is a schematic illustration of a lighting system with an apparatus for regulating an illuminance according to an exemplary embodiment.

FIG. 11 shows a schematic illustration of a lighting system 120 that comprises a plurality of luminaire modules 121-123. Each of the luminaire modules 121-123 has a luminaire 132 and a sensor 133 associated with the luminaire 132, the operation of these corresponding to that of the luminaire 2 and the sensor 3 that has been described with reference to FIG. 1. The apparatus 10 is coupled to the plurality of luminaire modules 121-123. The communication can take place via a bus 5. The apparatus 10 performs the functions described with reference to FIGS. 1 to 10 for the different luminaire modules 121-123 as a central apparatus. In this case, a control parameter is provided for each of the luminaire modules, the parameter value of said control parameter being able to be adjusted by the apparatus 10 as described with reference to FIGS. 1 to 10.

Figure 12:
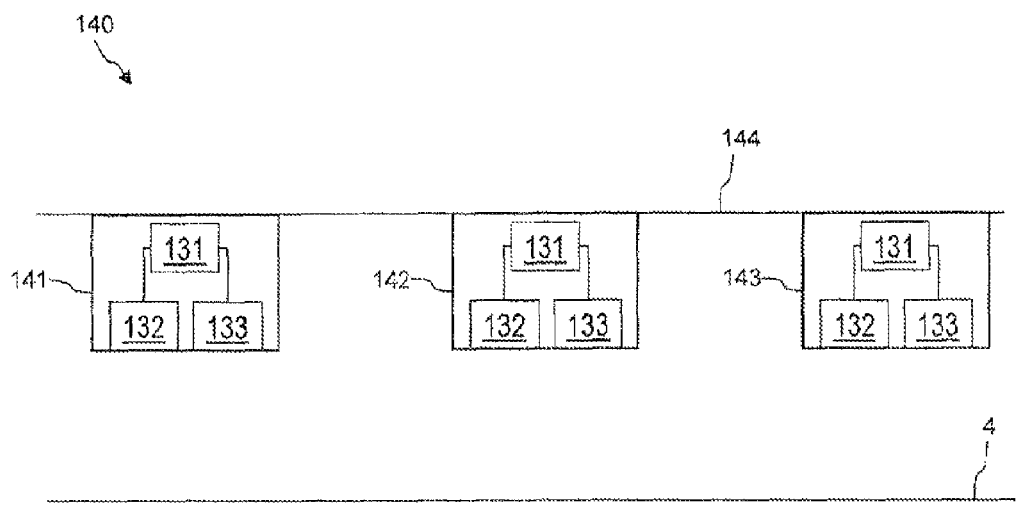
FIG. 12 is a schematic illustration of a lighting system with a plurality of apparatuses for regulating an illuminance according to an exemplary embodiment.

FIG. 12 is a schematic illustration of a lighting system 140 that comprises a plurality of luminaire modules 141-143. Each of the luminaire modules 141-143 has a luminaire 132 and a sensor 133 associated with the luminaire 132, the operation of these corresponding to that of the luminaire 2 and the sensor 3 that has been described with reference to FIG. 1. Each of the luminaire modules 141-143 is embodied as an intelligent luminaire module that comprises logic 131. For the corresponding luminaire module in which it is installed, the logic 131 performs the functions of regulation and parameter adjustment that have been described with reference to FIGS. 1 to 10 only for the luminaire module in question. To this end, the logic 131 evaluates sensor values received at a signal input in order to execute a control step and parameter adjustment.

Further modifications can be realized for further exemplary embodiments. While actuation commands are output as digital commands, for example, it is also possible for other actuation to take place. If actuation commands are not output as digital commands, it is not necessary for actuation values to be discretized or digitized. Actuation commands can also be transmitted wirelessly.

While, in the case of methods and apparatuses according to exemplary embodiments, a respective new actuation command is produced in a plurality of control steps, a new actuation command does not have to be produced for every call to a control procedure. In addition, the methods may also contain function calls to a control procedure that prompt identification of the fact that a new actuation value does not have to be determined and a new actuation command does not have to be output, since the sensor value is in a desired value range.

While exemplary implementations have been described for the determination of the actuation step and the determination of a new parameter value of the control parameter, it is possible for modifications to be used. By way of example, the new parameter value of the control parameter can be determined for a plurality of preceding control steps in the style of a sliding average on the basis of the respective parameter values. The new parameter value can be determined using different procedures on the basis of whether it is increased or decreased in comparison with the parameter value used of the control parameter in the last control step.

When the luminaire advances toward a new actuation value in a changeover process, it is possible for the actual value to be polled again following output of the actuation command within the changeover time too. For the parameter adjustment, a computer can take into account in equations (8) to (12) that the second actual value sensed following the control step does not yet correspond to the full actuation step, but rather only some of the change in the actuation value has been made up to the corresponding measurement instant. The actuation step used in equations (8) to (12) can accordingly be adjusted by computer in order to take account of the changeover process that is still in progress.

The invention also relates to a method for regulating an illuminance, wherein the control steps to be performed are determined as a function from the actual and setpoint illuminances and also one or more control parameters, with the control parameter or the control parameters being adaptively adjusted to suit the reaction of the control section by means of a self-learning method.

Methods and apparatuses according to exemplary embodiments attain various effects. Since the regulating system is adjusted automatically during the performance of a plurality of control steps, i.e. during the execution time, it is not necessary for separate maintenance to be performed for adjustment. Maintenance intervals for adjustment of the regulating system can thus be dispensed with. The switch-on process for fluorescent luminaires can be taken into account. A change in the reflection properties in the sensing range and aging of the illuminant can be taken into account automatically and can be taken into account by adjusting the parameter value of the control parameter. The methods and apparatuses are robust in respect of swapping of the luminaire, failure and recurrence of individual luminaries. The time delay between measurement of the illuminance and a change in the artificial lighting can be taken into account. Similarly, a change in the extraneous illuminance can be taken into account for the control steps. The data traffic can be reduced, which may be desirable particularly in the case of slow control protocols. Different illuminances of the artificial lighting can be supported.

Methods and apparatuses according to exemplary embodiments can be used for regulation of artificial light in the case of interior lighting. Methods and apparatuses according to exemplary embodiments can be used particularly for lighting offices, workspaces or business premises, without being limited thereto.

The invention claimed is:

1. A method for regulating an illuminance, wherein the following steps are repeatedly performed:
   determination of an actual value (71; 75; 84) from a sensor (3; 133), which is dependent on the illuminance to be regulated and is intended to be regulated to a setpoint value,
   execution of a control step (73, 74; 76-78), wherein an actuation step for a luminaire (2; 132) is determined on the basis of the determined actual value (71; 75; 84) and a parameter value of a control parameter, and wherein an actuation command produced on the basis of the actuation step is produced for the luminaire (2; 132), and
   automatic adjustment of the parameter value of the control parameter following at least one control step, wherein a new parameter value of the control parameter is determined on the basis of a first actual value (71; 75; 84) from the sensor (3; 133), which is determined before a corresponding control step (73, 74; 76-78) is executed, and a second actual value (71; 75; 84) from the sensor (3; 133), which is determined following execution of the corresponding control step (73, 74; 76-78).

2. The method as claimed in claim 1, wherein the automatic adjustment provides the new parameter value of the control parameter to be determined on the basis of a difference (87, 88) between the second actual value (86) and the first actual value (85) and on the basis of the actuation step determined in the corresponding control step (73, 74; 76-78).

3. The method as claimed in claim 1, wherein the following steps are performed following the execution of a control step (73, 74; 76-78):
   determination of a discrepancy between the second actual value (86), which is determined following the control step (73, 74; 76-78), and a computer estimation for the actual value, which computer estimation is determined on the basis of the parameter value used for the control parameter in the control step (73, 74; 76-78), and
   selective initiation of the automatic adjustment on the basis of the determined discrepancy.

4. The method as claimed in claim 1, wherein following a control step (73, 74; 76-78) the automatic adjustment of the parameter value of the control parameter is initiated in each case selectively on the basis of a criterion that is dependent on at least one of the following variables:
   the actuation step determined in the control step (73, 74; 76-78);
   a change in an extraneous light influence (89) over time before the control step;
   a period of time between the luminaire (2; 132) being switched on and the control step;
   a difference between the first actual value (85), which is determined before the control step (73, 74; 76-78), and the second actual value (86), which is determined after the control step (73, 74; 76-78).

5. The method as claimed in claim 1, wherein in the control step (73, 74; 76-78) the actuation step is determined on the basis of a difference between the setpoint value and the determined actual value (71; 75; 84) and also on the basis of the parameter value of the control parameter.

6. The method as claimed in claim 5, wherein in the control step (73, 74; 76-78) the actuation step is determined as the product of the difference and a proportionality factor that is dependent on the parameter value of the control parameter.

7. An apparatus for regulating an illuminance, comprising:
   an input (14) for receiving an actual value (71; 75; 84) from a sensor (3; 133), which is dependent on the illuminance to be regulated and which is intended to be regulated to a setpoint value; and
   an electronic computation device (11; 131) that is coupled to the input (14) and that is set up
   to determine an actuation step for a luminaire (2; 132) on the basis of the actual value (71; 75; 84) and a parameter value of a control parameter,
   to produce an actuation command on the basis of the actuation step, and
   to determine a new parameter value of the control parameter on the basis of a first actual value (85), which is received before a corresponding control step (73, 74; 76-78) is executed, and a second actual value (6), which is determined following execution of the corresponding control step (73, 74; 76-78), the apparatus being configured to perform the method as claimed in claim 2.

8. The method as claimed in claim 1, wherein a plurality of polling operations on a sensor (3; 133) are performed between two successive control steps (73, 74), in each case in order to determine the actual value (71; 75; 84), and
   wherein the number of the plurality of polling operations that are performed before the execution of the second control step (74) of the two successive control steps (73, 74) is dependent on a difference between an actual value (71; 75; 84) determined in at least one of the plurality of polling operations and the setpoint value.

9. The method as claimed in claim 8, wherein the actual values determined in the plurality of polling operations on the sensor (3; 133) are taken as a basis for estimating a change in the extraneous light influence (89) before the execution of the second control step (73) of the two successive control steps (73, 74).

10. The method as claimed in claim 9, wherein the automatic adjustment of the parameter value of the control parameter following the second control step (74) is performed selectively on the basis of a threshold value comparison of the change in the extraneous light influence (89).

11. The method as claimed in claim 1, wherein the new parameter value of the control parameter is determined following a control step (73, 74; 76-78) in each case on the basis of $$\frac{E_{Sensor}(n) - E_{Sensor}(v)}{\Delta I},$$

wherein $E_{Sensor}(v)$ is the first actual value (85), which is determined before the corresponding control step (73, 74; 76-78), $E_{Sensor}(n)$ is the second actual value (86), which is determined following the corresponding control step (73, 74; 76-78), and ΔI is the actuation step determined in the corresponding control step (73, 74; 76-78).

12. The method as claimed in claim 11, wherein the new parameter value of the control parameter is determined following a control step (73, 74; 76-78) in each case on the basis of $$(1-p) \cdot E_{Param}(\text{old}) + p \cdot \frac{E_{Sensor}(n) - E_{Sensor}(v)}{\Delta I}$$

wherein $E_{param}(\text{old})$ is the parameter value of the control parameter that was used in the control step (73, 74; 76-78) for determining the actuation step, and wherein p is a real number that satisfies 0≤p≤1.

13. The method as claimed in claim 12, wherein the new parameter value of the control parameter is determined using different procedures on the basis of whether the condition $$\frac{E_{Sensor}(n) - E_{Sensor}(v)}{\Delta I} > E_{Param}(\text{old})$$

is satisfied.

14. The method as claimed in claim 12, wherein in the control step (73, 74; 76-78) the actuation step is determined on the basis of $$\frac{E_{Setpoint} - E_{Sensor}(v)}{E_{Param}(\text{old})}$$

wherein $E_{Setpoint}$ is the setpoint value.

15. An apparatus for regulating an illuminance, comprising:
  an input (14) for receiving an actual value (71; 75; 84) from a sensor (3; 133), which is dependent on the illuminance to be regulated and which is intended to be regulated to a setpoint value; and
  an electronic computation device (11; 131) that is coupled to the input (14) and that is set up
    to determine an actuation step for a luminaire (2; 132) on the basis of the actual value (71; 75; 84) and a parameter value of a control parameter,
    to produce an actuation command on the basis of the actuation step, and
    to determine a new parameter value of the control parameter on the basis of a first actual value (85), which is received before a corresponding control step (73, 74; 76-78) is executed, and a second actual value (6), which is determined following execution of the corresponding control step (73, 74; 76-78).

16. The apparatus as claimed in claim 15, further comprising:
  a sensor (3; 133) that is coupled to the input (14) and is set up to provide the actual value (71; 75; 84) for the input (14), and
  a luminaire (2; 132) that is coupled to the electronic control device (11; 131) and is set up to change an emitted light power on the basis of the actuation command in response to the actuation command.

* * * * *